United States Patent [19]
Wright et al.

[11] Patent Number: 6,151,787
[45] Date of Patent: Nov. 28, 2000

[54] LEVELLING APPARATUS FOR A BUILDER'S LASER LEVEL

[75] Inventors: Randall J. Wright, Hartland; Joseph B. Coel, Waterford, both of Wis.

[73] Assignee: Empire Level Mfg. Corp., Milwaukee, Wis.

[21] Appl. No.: 09/134,685

[22] Filed: Aug. 14, 1998

[51] Int. Cl.[7] .............................. G01C 15/00; G01C 5/00
[52] U.S. Cl. ............................................... 33/286; 33/290
[58] Field of Search .............................. 33/281, 282, 283, 33/286, 333, 370, 371, 568, 573

[56] References Cited

U.S. PATENT DOCUMENTS

| | | | |
|---|---|---|---|
| 368,308 | 9/1887 | Richardson | 33/285 |
| 494,876 | 4/1893 | Merrill | 33/290 |
| 753,149 | 2/1904 | Lankford | 33/285 |
| 1,151,549 | 8/1915 | Schade | 248/180.1 |
| 2,308,206 | 1/1943 | Poland | 33/290 |
| 2,459,626 | 1/1949 | Coutant et al. | 248/126 |
| 4,035,084 | 7/1977 | Ramsay | 33/291 |
| 4,579,436 | 4/1986 | Jaumann | 248/163.1 |
| 4,948,086 | 8/1990 | Buol et al. | 248/675 |
| 4,964,218 | 10/1990 | Morghen | 33/293 |
| 5,575,073 | 11/1996 | von Wedemayer | 33/365 |
| 5,604,987 | 2/1997 | Cupp | 33/275 R |
| 5,966,829 | 10/1999 | Lia et al. | 33/556 |

*Primary Examiner*—Christopher W. Fulton
*Assistant Examiner*—Quyen Doan
*Attorney, Agent, or Firm*—Jansson, Shupe, Bridge & Munger, Ltd.

[57] ABSTRACT

A levelling apparatus for a builder's laser level includes a base having a central axis and a sphere-shaped socket component mounted to the base. A sphere-shaped ball device is received in the socket component for relative movement with respect thereto. A retention mechanism is spaced radially outwardly from the central axis and includes first and second locking members in overlapping relationship to one another, thereby retaining the ball device in the socket component. In a second embodiment of the levelling apparatus, the sphere-shaped ball device is mounted to the base and the sphere-shaped socket component mounted to the ball device for relative movement with respect thereto. The retention mechanism is in registry with the central axis and includes first and second locking members in overlapping relationship to one another, thereby retaining the socket component to the ball device.

10 Claims, 7 Drawing Sheets

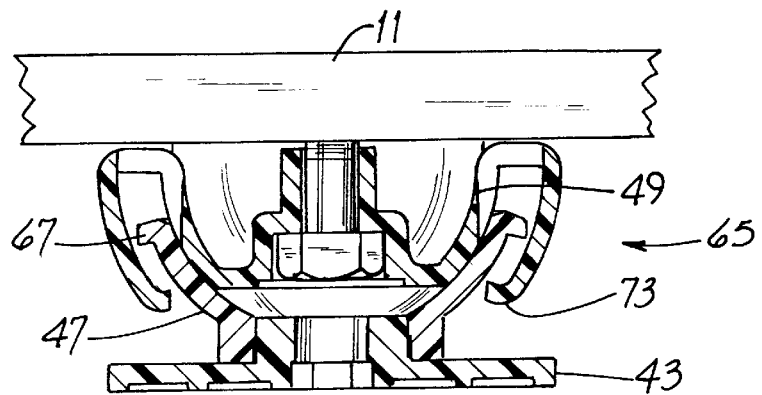
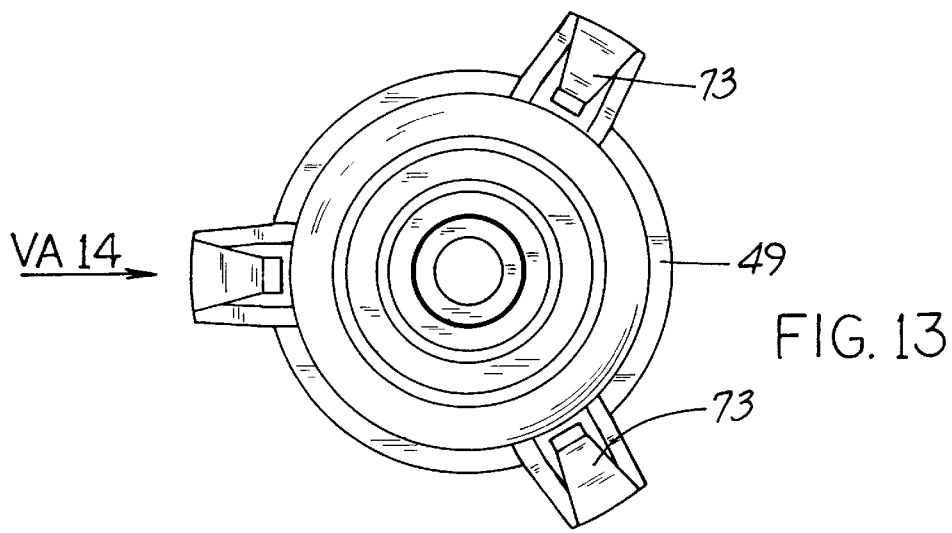
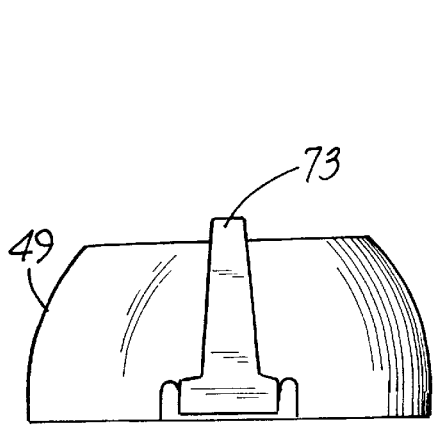
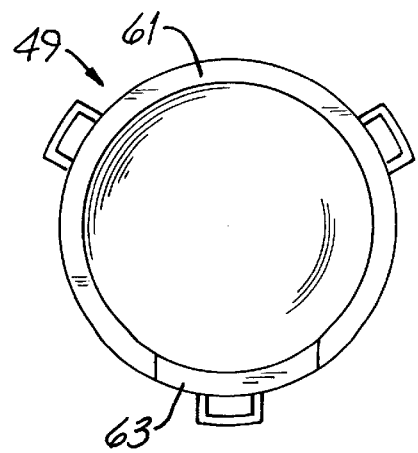

LEVELLING APPARATUS FOR A BUILDER'S LASER LEVEL

FIELD OF THE INVENTION

This invention relates generally to supports and, more particularly, to supports of the type having a platform for mounting a geometric instrument, e.g., a builder's level.

BACKGROUND OF THE INVENTION

Builder's spirit levels have been in wide use for decades, perhaps centuries, for establishing reference lines and planes used during construction of roads, buildings, sidewalks and the like. A more recent innovation is a builder's level which includes spirit vials for levelling and which also includes a laser light source for "spotting" a remote reference point upon a structure.

Equally common are the tripods upon which such levels are supported and examples of earlier tripods and levels are disclosed in U.S. Pat. No. 494,876 (Merrill), U.S. Pat. No. 753,149 (Lankford), U.S. Pat. No. 1,151,549 (Schade) and U.S. Pat. No. 2,308,206 (Poland). One of the features of the tripods shown in the Lankford and Schade patents is a levelling screw arrangement.

More recently developed tripods used by professional engineers and builders have a number of additional features not disclosed in the Merrill, Lankford, Schade and Poland patents. And while such features make the tripod easier to use and more accurate in use, the cost of such professional tripods has risen accordingly. In a modern, professional tripod, the levelling screw platform and related hardware is, itself, a rather costly component of the tripod.

A professional engineer or builder can justify the expense of such a tripod—after all, the tripod is an important tool of the profession and is subjected to use, perhaps hard use, daily or nearly so. But a homeowner/builder who might use a tripod only infrequently to, e.g., lay a sidewalk, build a shed or the like, has great difficulty justifying the expense of a professional-class tripod.

And that is not the only reason why a professional-class tripod might not be appropriate for the casual user. Another reason relates to ease (or, conversely, complexity) of operation. Modern professional-class tripods have a number of parts, including adjustment-related parts which, while contributing to the absolute accuracy required by a professional, may be baffling to the uninitiated user.

In view of the invention, it is neither necessary nor desirable for the casual homeowner/builder to employ a professional-quality tripod or, for that matter, to employ any tripod at all.

OBJECTS OF THE INVENTION

It is an object of the invention to provide a new levelling apparatus, often referred to in the trade as a "levelling base," which overcomes some of the problems and shortcomings of the prior art.

Another object of the invention is to provide a new levelling apparatus which is easy for a casual homeowner/builder to use.

Another object of the invention is to provide a new levelling apparatus which is low in cost.

Still another object of the invention is to provide a new levelling apparatus which is compatible with commonly-available camera tripods.

Another object of the invention is to provide a new levelling apparatus which is useful alone, i.e., without a tripod of any type.

Another object of the invention is to provide a new levelling apparatus which is freely adjustable without the use of levelling screws or the like.

Yet another object of the invention is to provide a new levelling apparatus which, in a particular embodiment, provides three degrees of freedom of movement of a level mounted thereon. How these and other objects are accomplished will become apparent from the following descriptions and from the drawings.

SUMMARY OF THE INVENTION

The invention involves a levelling apparatus for a builder's level, e.g., a combined spirit and laser level. The apparatus is low in cost and suitable for purchase and use by the home craftsman.

Such apparatus includes a substantially flat, dislike base having a central axis generally perpendicular to such base. A cup-like, sphere-shaped socket component is mounted to the base and, more particularly, is mounted atop the base.

A sphere-shaped ball device, nominally a half-sphere, is received in the socket component for relative movement with respect thereto. The ball device, which supports the level, and the socket component are held in sliding contact with one another solely by the weight of the level and ball device bearing downwardly against the socket component. In this configuration, the levelling apparatus permits three degrees of movement of the level mounted thereon, namely, up-down, canted or tipped to either side, and rotational, all as described in more detail below.

While the levelling apparatus is fully functional with the components described above, there is some risk of physical damage to the level mounted thereon. Whether or not the apparatus is supported only on its base or whether the base is supported atop a tripod, the ball device (to which the level is secured) can be freely removed from (or can easily fall out of) the socket component if the apparatus or its supporting tripod are inadvertently bumped or tipped over.

To the end of helping to prevent damage to the level, the highly preferred apparatus includes a retention mechanism having first and second locking members in overlapping relationship to one another, thereby retaining the ball device in the socket component. In one embodiment, the retention mechanism is spaced radially outwardly from the central axis and has a first locking member with a lip extending radially outwardly from the socket component. The second locking member includes a hook overlapping the lip and, most preferably, includes a plurality of hooks overlapping the lip.

In a specific embodiment, there are three hooks spaced 120° apart. Such hooks are somewhat flexible and extend outwardly and downwardly from the ball device, terminate below the lip and overlap the lip so that the socket component and the ball device cannot be separated from one another without flexing the hooks outwardly, thereby releasing them from the lip.

In another aspect of the invention, the socket component is fixed with respect to the base (by, e.g., sonic welding) so that the socket component and base cannot rotate or otherwise move with respect to one another. The socket component has an inner surface which is spherical over 360°. To state it another way, all points on the inner surface which are coincident with a plane perpendicular to the base-and-component central axis are at the same distance from such axis.

Similarly, the ball device includes an outer surface spherical over 360° and contacting the inner surface of the socket component, thereby permitting the ball device to pivot in any direction with respect to the socket component. To state that relationship another way, the ball device can be moved in such a way that a ball device concentric axis can circumscribe a circle on the plane mentioned above and can intersect such plane anywhere within the circle.

A specific embodiment of a ball device includes structure for aiding positional retention of the ball device and the laser level with respect to one another. In this embodiment, the ball device has an upper rim with a notch formed in it. The laser level includes a lower support or rail which is received in the notch with close fit.

There is some possibility that the embodiment of the apparatus which permits the ball device to pivot in any direction with respect to the socket component might be a bit unstable for some homeowner/users of the apparatus. In another embodiment, the apparatus includes a guide mechanism spaced radially outwardly from the central axis. Such guide mechanism has first and second guide members in overlapping relationship, thereby permitting only one degree of freedom of movement of the ball device with respect to the socket component.

In one, more-specific embodiment, the first guide member includes an arcuate groove in the socket component and the second guide member includes a tongue on the ball device and projecting into the groove. In another, similar embodiment (which might be termed an "inside out" version of the embodiment described immediately above), the second guide member includes a groove in the ball device and the first guide member includes a tongue on the socket component and projecting into the groove. In either embodiment involving the tongue-in-groove arrangement, the ball device has only one degree of freedom of movement with respect to the socket component. To state that ball device/socket component relationship in more geometric terms, when the ball device is moved with respect to the socket component, a device concentric axis can "sweep" or define only a plane.

However, given the fact that the socket component is movable with respect to the base permits the supported level to have three degrees of freedom of movement. To state this latter relationship another way, the ball device can be moved in such a way that a ball device concentric axis can circumscribe a circle on the plane mentioned above and can intersect such plane anywhere within the circle. This second embodiment may also have a notch in the upper rim of the ball device and a laser level rail received in such notch for positional retention.

Yet another embodiment of a levelling apparatus for a builder's level includes the base having its central axis, a sphere-shaped ball device mounted to the base, and a sphere-shaped socket component mounted to the ball device for relative movement with respect thereto. The retention mechanism is in registry with the central axis and includes first and second locking members in overlapping relationship to one another, thereby retaining the socket component to the ball device.

In more specific aspects of this embodiment, the first locking member includes a ball fixed with respect to the socket component and the second locking member includes a releasable clamping ring overlapping the ball. Most preferably, the socket component includes an axis and the first locking member includes a post fixed on the socket component, extending along the axis and having a distal end. The ball is affixed to such distal end.

In another aspect of this embodiment, the clamping ring is a split ring and does not extend entirely around the ball. And the split ring has a paddle-like tang extending away from it.

The retention mechanism includes a lever mounted for pivoting movement with respect to the base and about an axis offset from and parallel to the base axis. Such lever has a bearing surface against the tang, thereby closing the clamping ring snugly against the ball when the lever is pivoted in a ring-closing direction. (Of course, when the lever is pivoted in a ring-opening direction, the ring is released from the ball and with a little urging, the ball can be withdrawn from the ring.) With this arrangement, the ball device is prevented from separating from the socket component (if the apparatus or its tripod are tipped, for example) and the ball device may be positionally fixed with respect to such socket component.

The second embodiment might be termed an "upside down" version of the first embodiment. In the second embodiment, the ball device includes an outer surface spherical over 360°. The socket component includes an inner surface spherical over 360° and contacting the outer surface of the ball device, thereby permitting the ball device to pivot in any direction with respect to the socket component.

Further aspects of the invention are set forth in the following detailed description and in the drawings.

BRIEF DESCRIPTION OF THE DRAWINGS

FIG. 12 is a view generally like FIG. 11 and including the level mounted on the apparatus. Parts are broken away.

FIG. 13 is a bottom plan view of the ball device shown in FIG. 12.

FIG. 14 is an elevation view of the ball device shown in FIG. 13 taken along the viewing axis VA14.

FIG. 15 is a top plan view of the ball device of FIGS. 13 and 14 showing the rail retaining notch formed therein.

DETAILED DESCRIPTION OF PREFERRED EMBODIMENTS

Figure 1:
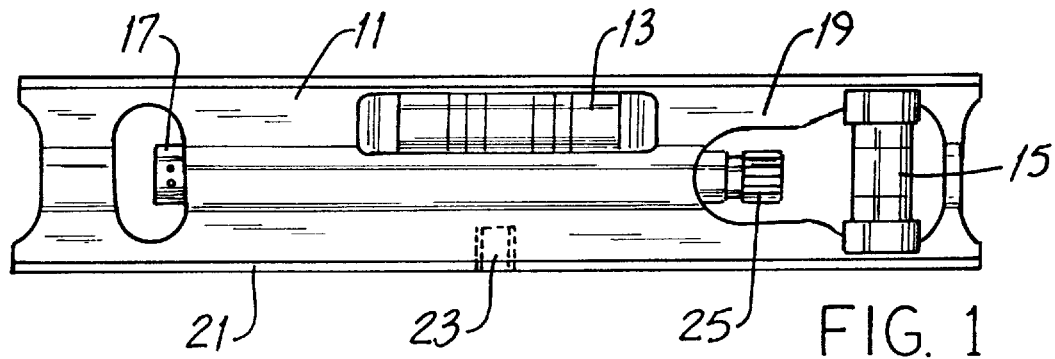
FIG. 1 is a side elevation view of a known type of builder's laser level.

Before describing the new apparatus 10, it will be helpful to have an understanding of but one type of builder's level with which the apparatus 10 can be used. Referring to FIGS. 1 through 4, an exemplary level 11, about 10 inches in length, includes two spirit level vials 13, 15 and a laser light source 17, all mounted in the level body 19. The body 19 includes a lower rail 21 and a drilled, tapped hole 23 in such rail 21, the purposes of both of which are described below.

When the switch 25 is rotated to the "on" position, the source 17 emits a laser beam 27. Such beam 27 is horizontal when the vial 13 indicates that the body 19 and its lower rail 21 are horizontal or is vertical when the vial 15 indicates that the body 19 and its lower rail 21 are vertical. An exemplary way in which the level 11 and its laser beam 27 are used are described below.

Figure 2:
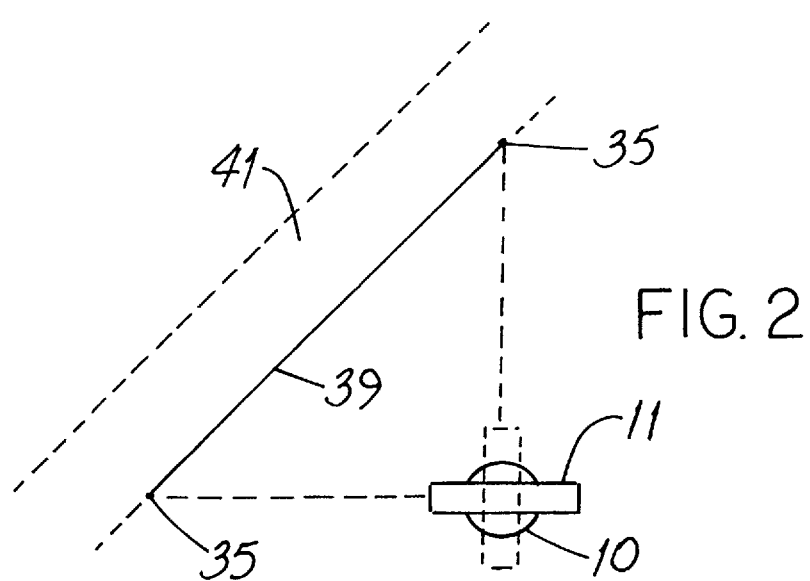
FIG. 2 is a representative top plan view illustrating how the level of FIG. 1 can be used with the inventive apparatus for construction purposes.
Figure 3:
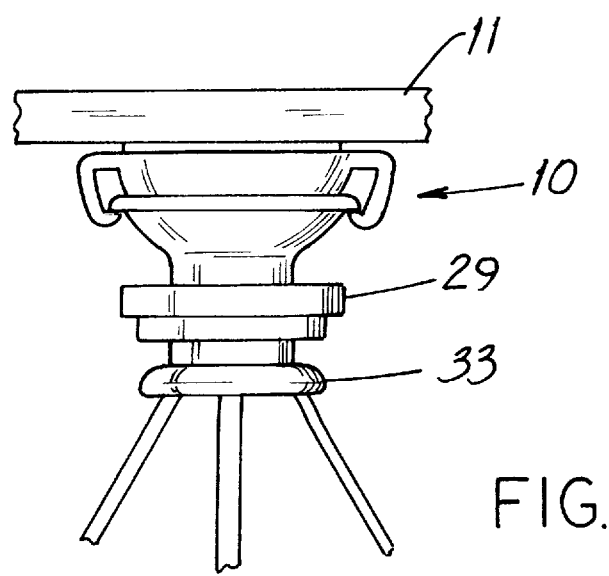
FIG. 3 is a representative side elevation view of the level of FIG. 1 mounted to the inventive apparatus which, in turn, is mounted to a conventional tripod. Parts are broken away.
Figure 4:
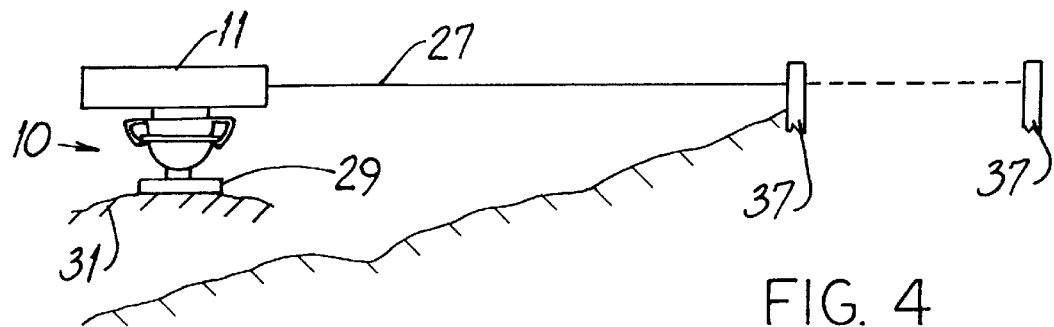
FIG. 4 is a representative side elevation view, partly in section, illustrating how the level of FIG. 1 can be used with the inventive apparatus for construction purposes.

Merely as one example of the way in which the apparatus 10 is used, FIGS. 2, 3 and 4 show a level 11 attached to the apparatus 10. The base 29 is resting atop the earth 31 or atop some other support, e.g., a tripod 33, support platform or the like. The level 11 is manipulated as described above to establish two reference points 35 marked on stakes 37 or the like. A string line 39 between the points 35 is horizontal and establishes a reference to guide digging a shallow trench, laying gravel in the trench and pouring and smoothing concrete over the gravel, all to form a residential sidewalk 41. (It is apparent from the foregoing that given the fact that apparatus 10 can be used alone, i.e., without a tripod 33, the level 11 can be positioned at an elevation such that the reference points 35 are about coincident with the surface of the proposed sidewalk 41. Such positioning may not be possible when using a tall, conventional tripod 33 of any type.)

Figure 5:
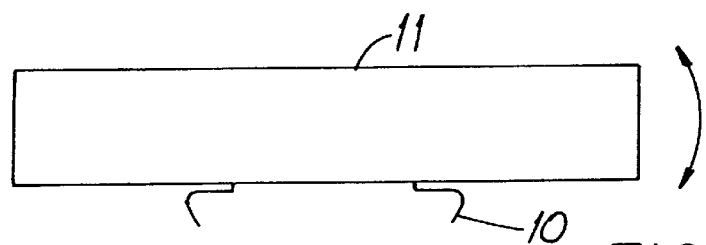
FIGS. 5, 6 and 7 are representative side elevation, end elevation and top plan views, respectively, illustrating how the inventive apparatus provides three degrees of freedom of movement of the level.
Figure 6:
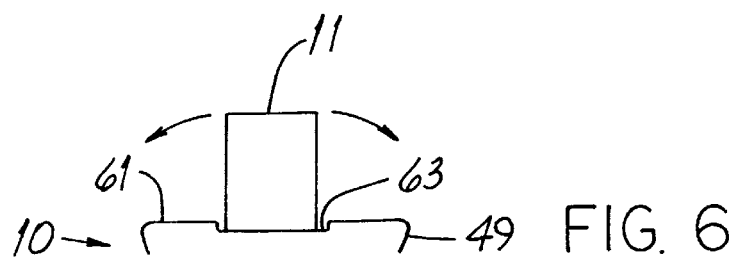
Figure 7:
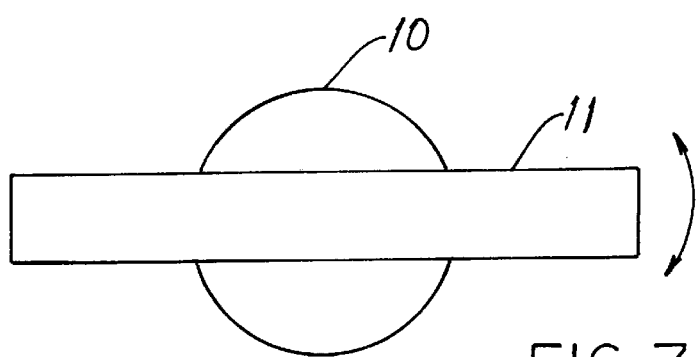
Figure 8:
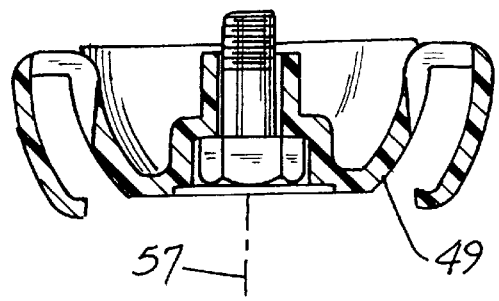
FIG. 8 is an elevation view, partly in section and partly in full representation, of an embodiment of the ball device of the new apparatus.
Figure 9:
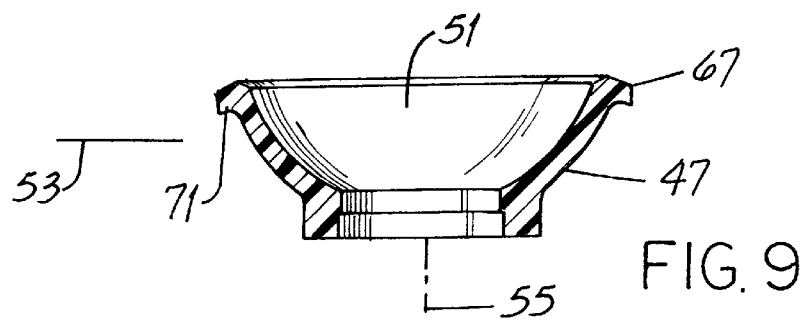
FIG. 9 is a sectional elevation view of an embodiment of the socket component of the new apparatus.
Figure 10:
FIG. 10 is a sectional elevation view of an embodiment of the base of the new apparatus.

Considering FIGS. 5, 6 and 7, when used with the apparatus 10, the level 11 may be said to have three degrees of freedom of movement. Up/down movement is represented by FIG. 5, canting or tipping left/right is represented by FIG. 6 and/or rotating clockwise/counterclockwise is represented by FIG. 7.

Details of the new apparatus 10 will now be set forth. Referring also to FIGS. 8 through 15 the apparatus 10 includes a substantially flat, disc-like base 43 having a central axis 45 generally perpendicular to such base 43. A cup-like, sphere-shaped socket component 47 is mounted to the base 43 and, more particularly, is mounted atop the base 43. In this embodiment, the component 47 is affixed to the base 43 to prevent relative movement between the socket component 47 and the base 43.

A sphere-shaped ball device 49, nominally a half-sphere, is received in the socket component 47 for relative movement with respect thereto. The ball device 49, which supports the level 11, and the socket component 47 are held in sliding contact with one solely by the weight of the level 11 and ball device 49 bearing downwardly against the socket component 47.

Describing other aspects of the component 47 and device 49, the socket component 47 has an inner surface 51 which is spherical over 360°. To state it another way, all points on the inner surface 51 which are coincident with a plane 53 perpendicular to the component central axis 55 are at the same distance from such axis 55.

Figure 16:
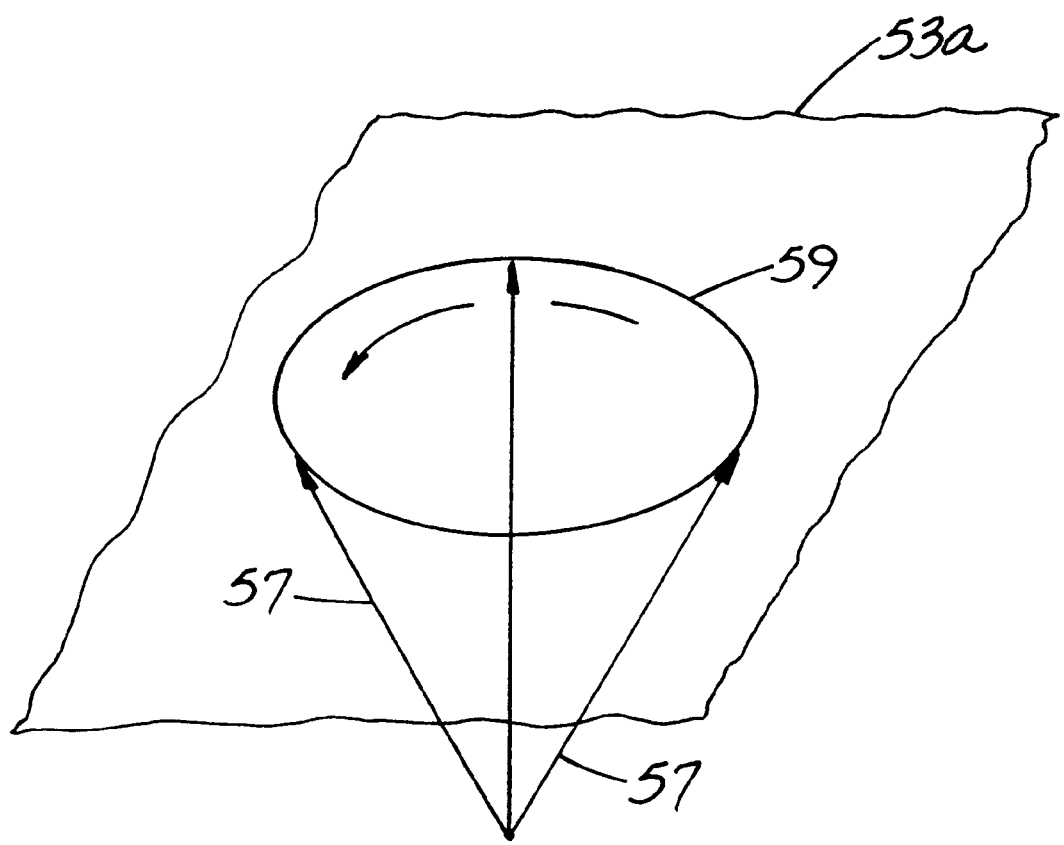
FIG. 16 is a spatial geometric representation used in connection with descriptions in the specification.
Figure 17:
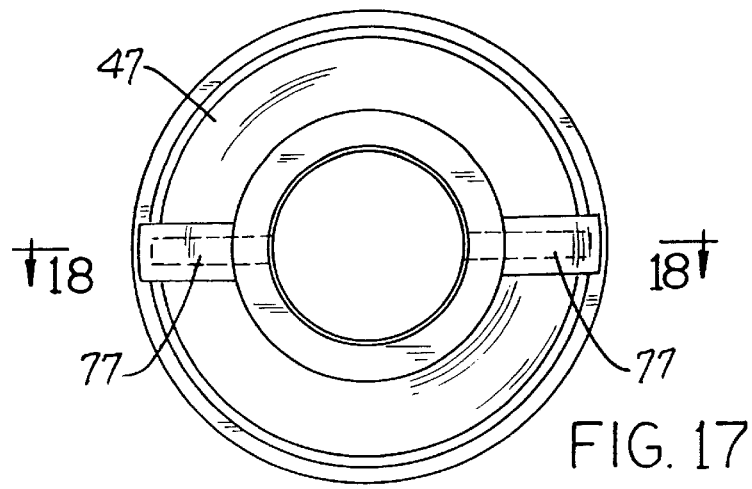
FIG. 17 is a top plan view of another embodiment of the socket component of the apparatus.
Figure 18:
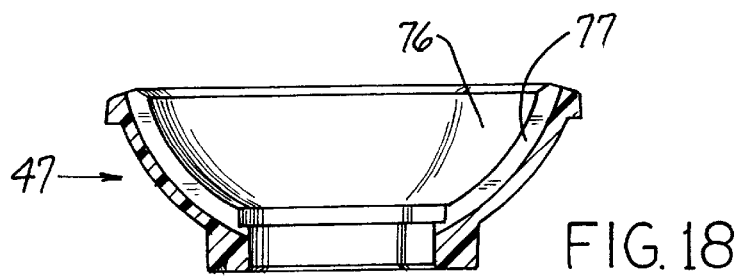
FIG. 18 is a sectional view of the socket component of FIG. 17 taken along the viewing plane 18—18 thereof.
Figure 19:
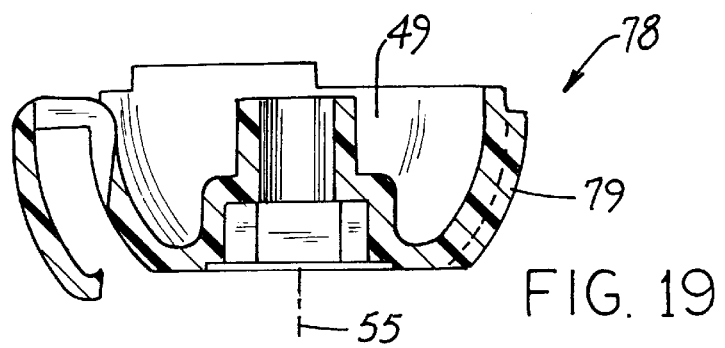
FIG. 19 is a sectional view of another embodiment of the ball device of the apparatus.
Figure 20:
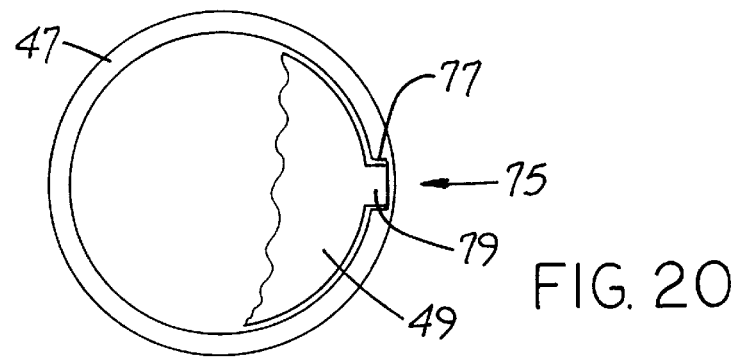
FIG. 20 is a simplified top plan view showing a guide mechanism used in one embodiment of the apparatus.

Similarly, the ball device 49 includes an outer surface spherical over 360° and contacting the inner surface 51 of the socket component 47, thereby permitting the ball device 49 to pivot in any direction with respect to the socket component 47. To state that relationship another way and considering FIG. 16, the ball device 49 can be moved in such a way that a ball device 49 concentric axis 57 can circumscribe a circle 59 on a plane 53a parallel to plane 53 and can intersect such plane 53a anywhere within the circle 59.

Referring now to FIGS. 6, 11 through 15, a specific embodiment of a ball device 49 includes structure for aiding positional retention of the ball device 49 and the laser level 11 with respect to one another. In this embodiment, the ball device 49 has an upper rim 61 with a notch 63 formed in it. The laser level 11 includes the lower support or rail 21 which is received in the notch 63 with close fit.

While the levelling apparatus 10 is fully functional with the components described above, there is some risk of physical damage to the level 11 mounted thereon. Whether or not the apparatus 10 is supported only on its base 43 or whether the base 43 is supported atop a tripod 33, the ball device 49 (to which the level 11 is secured) can be freely removed from (or can easily fall out of) the socket component 47 if the apparatus 10 (with or without a supporting tripod 33) is tipped over.

To the end of helping to prevent damage to the level 11, the highly preferred apparatus 10 includes a retention mechanism 65 having first and second locking members 67, 69, respectively, in overlapping relationship to one another, thereby retaining the ball device 49 on the socket component 47. In one embodiment, the retention mechanism 65 is spaced radially outwardly from the central axis 45 and has a first locking member 67 with a lip 71 extending radially outwardly from the socket component 47. The second locking member 69 includes a hook 73 overlapping the lip 71 and, most preferably, includes a plurality of hooks 73 overlapping the lip 71.

In a specific embodiment, there are three hooks 73 spaced 120° apart. Such hooks 73 are somewhat flexible and extend outwardly and downwardly from the ball device 49, terminate below the lip 71 and overlap the lip 71 so that the socket component 47 and the ball device 49 cannot be separated from one another without flexing the hooks 73 outwardly, thereby releasing them from the lip 71.

Figure 11:
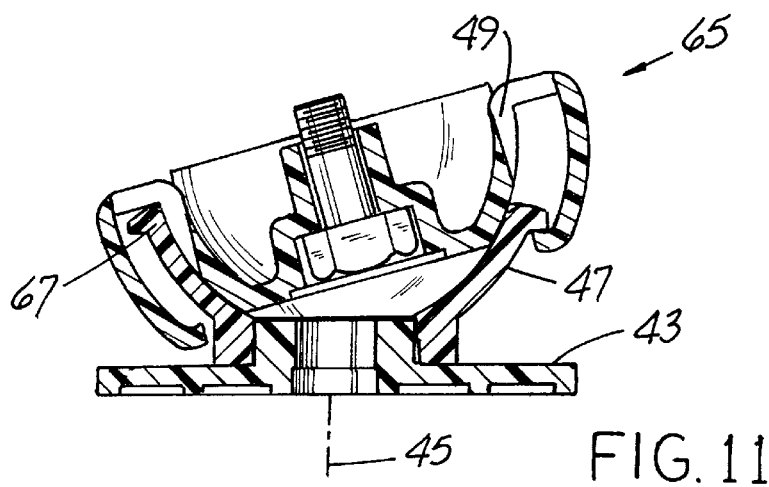
FIG. 11 is a sectional elevation view of the apparatus with the base, socket component and ball device assembled to one another. The level-retaining hex head bolt is in full representation.

Referring now to FIGS. 17 through 20, there is some possibility that the embodiment of the apparatus shown in FIGS. 11 and 12, which permits the ball device 49 to pivot in any direction with respect to the socket component 47 might be a bit unstable for some homeowner/users of the apparatus 10. In another embodiment, the apparatus 10 includes a guide mechanism 75 spaced radially outwardly from the central axis 55. Such guide mechanism 75 has first and second guide members 77, 79, respectively, in overlapping relationship, thereby permitting only one degree of freedom of movement of the ball device 49 with respect to the socket component 47.

In a preferred embodiment, the first guide member 76 is an arcuate groove 77 in the socket component 47 and the second guide member 78 includes a tongue 79 on the ball device 49 and projecting into the groove 77. (Another, similar embodiment which might be termed an "inside out" version, the second guide member 78 includes a groove 77 in the ball device 49 and the first guide member 76 includes a tongue 79 on the socket component 47 and projecting into the groove 77.)

In either embodiment involving the tongue-in-groove arrangement, the ball device 49 has only one degree of freedom of movement with respect to the socket component 47. To state that ball device/socket component relationship in more geometric terms, when the ball device 49 is moved with respect to the socket component 47, a device concentric axis 57 can "sweep" or define only a plane.

However, given the fact that in this embodiment the socket component 47 is movable with respect to the base 43 permits the supported level 11 to have three degrees of freedom of movement. To state this latter relationship another way, the ball device 49 can be moved in such a way that a ball device concentric axis 55 can circumscribe a circle 59 on the plane 53a mentioned above and can intersect such plane 53a anywhere within the circle 59. This second embodiment may also have a notch 63 in the upper rim 61 of the ball device 49 and a laser level rail 21 received in such notch 63 for positional retention.

Figure 21:
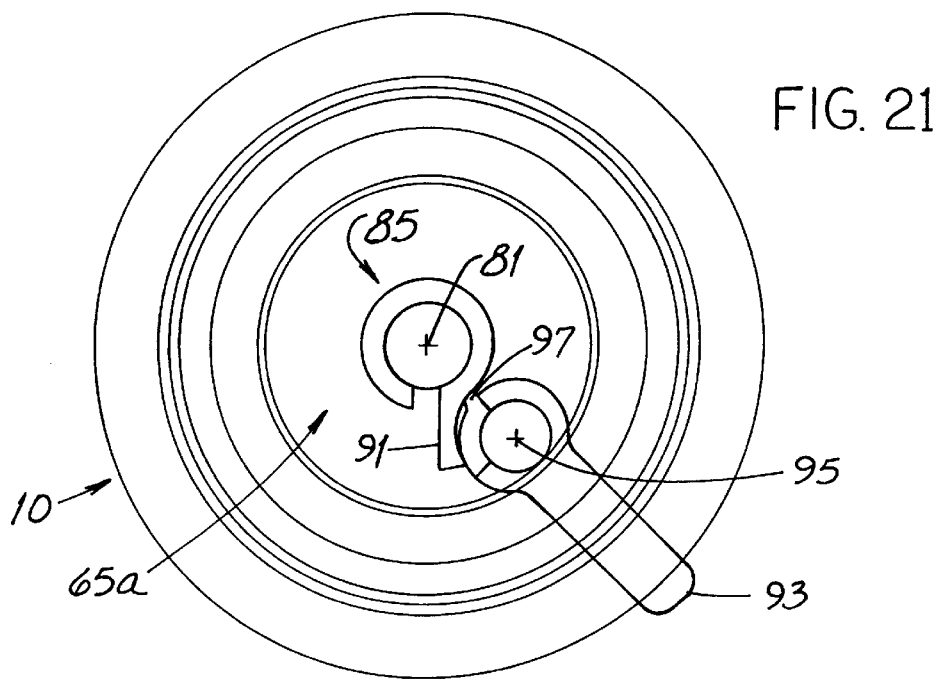
FIG. 21 is a phantom top plan view showing yet another embodiment of the invention.
Figure 22:
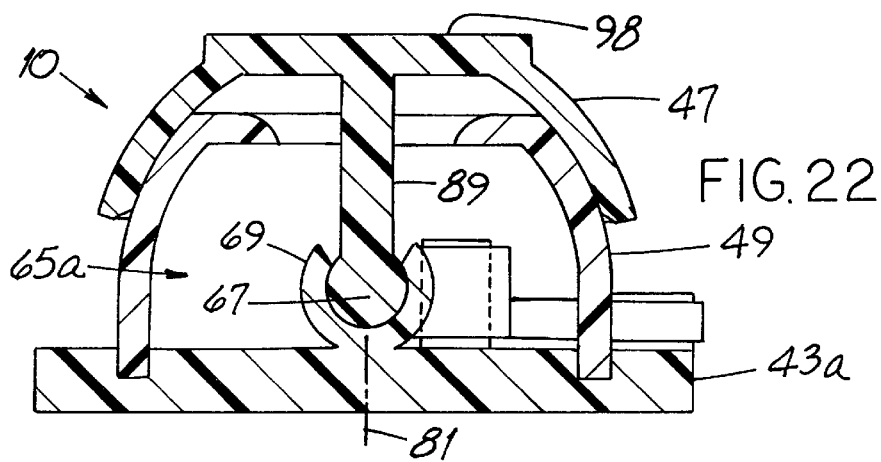
FIG. 22 is a side elevation view, partly in section and partly in full representation, of the embodiment of FIG. 21.
Figure 23:
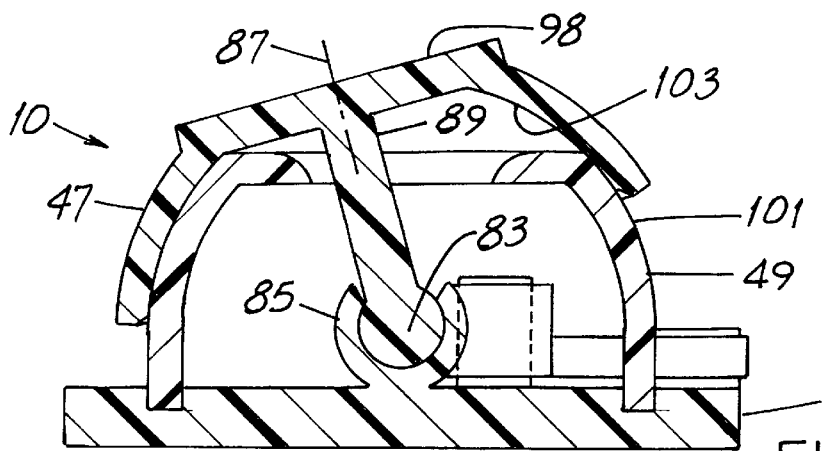
FIG. 23 is another side elevation view, partly in section and partly in full representation, of the embodiment of FIG. 21.

Referring now to FIGS. 21, 22 and 23 yet another embodiment of a levelling apparatus 10 for a builder's level 11 includes the base 43a having its central axis 81, a sphere-shaped ball device 49 mounted to the base 43a, and a sphere-shaped socket 47 component mounted to the ball device 49 for relative movement with respect thereto. The retention mechanism 65a is in registry with the central axis 81 and includes first and second locking members 67, 69, respectively, which are in overlapping relationship to one another, thereby retaining the socket component 47 to the ball device 49.

In more specific aspects of this embodiment, the first locking member 67 includes a ball 83 fixed with respect to the socket component 47 and the second locking member 69 includes a releasable clamping ring 85 overlapping the ball 83. Most preferably, the socket component 47 includes an axis 87 and the first locking member 67 includes a post 89 fixed on the socket component 47, extending along the axis 87 and having the ball 83 affixed to the post distal end.

In another aspect of this embodiment, the clamping ring 85 is a split ring and does not extend entirely around the ball 83. And the split ring 85 has a paddle-like tang 91 extending away from it.

The retention mechanism includes a lever 93 mounted for pivoting movement with respect to the base 43a and about an axis 95 offset from and parallel to the base axis 81. Such lever 93 has a bearing surface 97 against the tang 91, thereby closing the clamping ring 85 snugly against the ball 83 when the lever 93 is pivoted in a ring-closing direction, i.e., counterclockwise in the view of FIG. 21. The level 11 rests atop the surface 98 of the component 47. (Of course, when the lever 93 is pivoted in a ring-opening direction, the ring 85 is released from the ball 83. With a little urging—the ring 85 is slightly flexible—the ball 83 can be withdrawn from the ring 85.) With this arrangement, the socket component 47 and the ball device 49 are prevented from easily separating from one another if the apparatus or its tripod are tipped, for example. And the ball device 49 may be positionally fixed with respect to such socket component 47.

The third embodiment of FIGS. 21, 22 and 23, might be termed an "upside down" version of the first embodiment. In the third embodiment, the ball device 49 includes an outer surface 101 spherical over 360°. The socket component 47 includes an inner surface 103 spherical over 360° and contacting the outer surface 101 of the ball device 49, thereby permitting the ball device 49 to pivot in any direction with respect to the socket component 47.

While the principles of the invention have been shown and described in connection with a few preferred embodiments, it is to be understood clearly that such embodiments are by way of example and are not limiting.

By way of definition, in the field of engineering mechanics, a body constrained so that its position can be specified by one coordinate is said to have a single degree of freedom. Similarly, a body constrained so that its position can be specified by two coordinates is said to have two degrees of freedom and a body, like the level 11 when mounted to an apparatus 10 disclosed herein, which may require three coordinates to specify its position is said to have three degrees of freedom of movement.

Terms such as "upper," "lower" and the like are used to denote position relationships as perceived by a viewer of the drawings which form a part of this specification. As applied to the component 47 or the device 49, the term "sphere-shaped" or "spherical" means that such component 47 or device 49 has a surface which defines a portion of a sphere (which has a constant radius of curvature) or has three points which are coincident with a sphere.

What is claimed:

1. A levelling apparatus for a builder's level including:
  a base having a central axis;
  a sphere-shaped socket component mounted to the base;
  a sphere-shaped ball device received in the socket component for relative movement with respect to such socket component; and
  a sphere-shaped retention mechanism spaced radially outward from the sphere-shaped ball device and including first and second locking members in overlapping relationship to one another, thereby retaining the ball device in the socket component.

2. The apparatus of claim 1 wherein:
  the first locking member includes a lip extending radially outwardly from the socket component; and
  the second locking member includes a hook overlapping the lip.

3. The apparatus of claim 2 wherein:
  the second locking member includes a plurality of hooks overlapping the lip.

4. The apparatus of claim 3 wherein:
  the socket component is fixed with respect to the base and includes an inner surface spherical over 360°; and
  the ball device includes an outer surface spherical over 360° and contacting the inner surface of the socket component, thereby permitting the ball device to pivot in any direction with respect to the socket component.

5. The apparatus of claim 4 in combination with a laser level and wherein:
  the ball device has an upper rim with a notch formed therein; and
  the laser level includes a lower rail received in the notch, thereby aiding positional retention of the ball device and the laser level with respect to one another.

6. The apparatus of claim 1 including:

a guide mechanism spaced radially outwardly from the central axis and including first and second guide members in overlapping relationship, thereby permitting only one degree of freedom of movement of the ball device with respect to the socket component.

7. The apparatus of claim 6 wherein:

the first guide member includes a groove in the socket component; and the second guide member includes a tongue on the ball device and projecting into the groove.

8. The apparatus of claim 6 wherein:

the second guide member includes a groove in the ball device; and the first guide member includes a tongue on the socket component and projecting into the groove.

9. The apparatus of claim 6 wherein the socket component is movable with respect to the base.

10. The apparatus of claim 6 in combination with a laser level and wherein:

the ball device has an upper rim with a notch formed therein; and the laser level includes a lower rail received in the notch, thereby aiding positional retention of the ball device and the laser level with respect to one another.

* * * * *